Feb. 6, 1934.     W. J. COULTAS     1,945,732
WAGON HITCH
Filed May 3, 1933     3 Sheets-Sheet 1
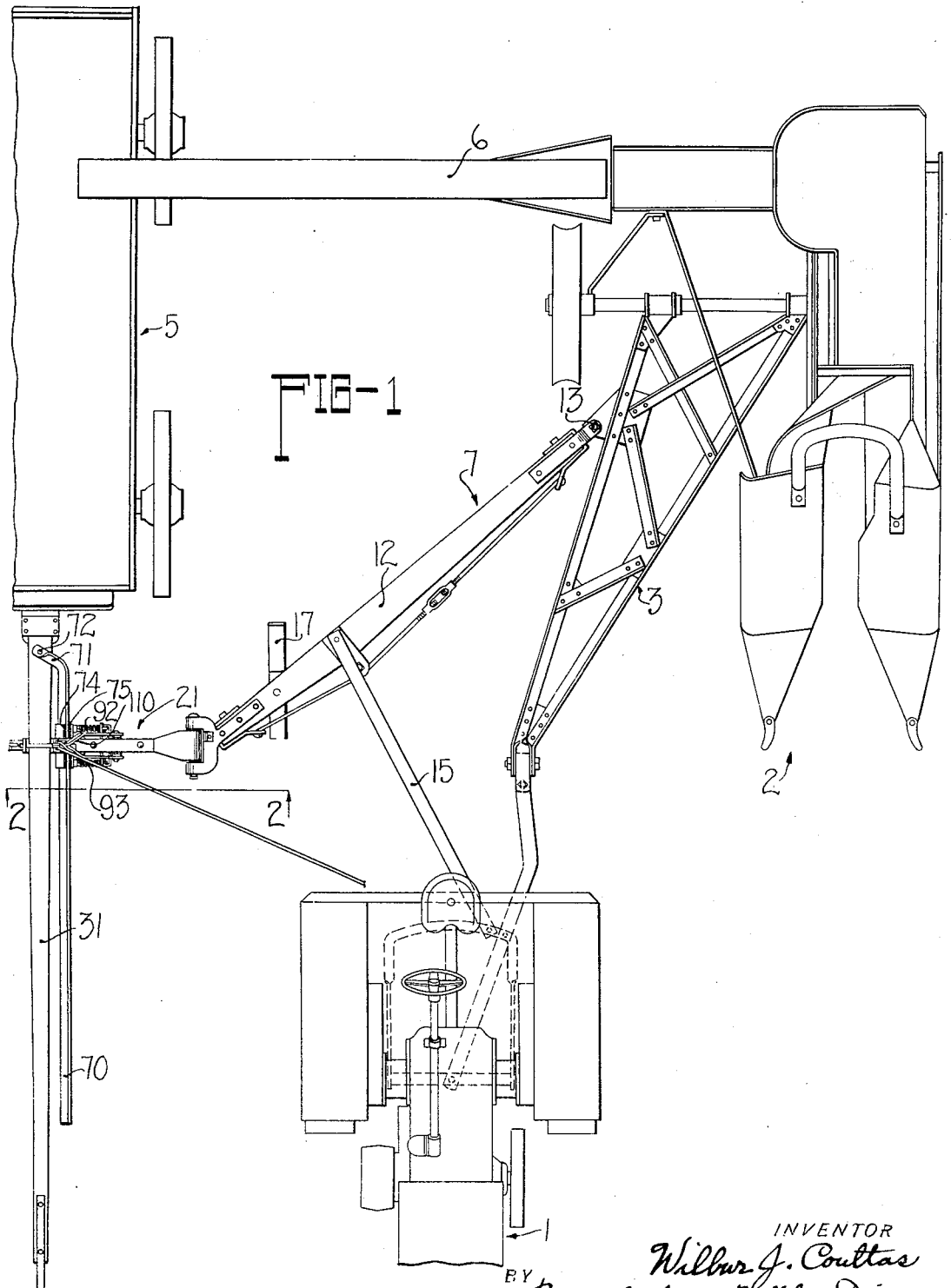
INVENTOR
Wilbur J. Coultas
BY Brown, Jackson, Boettcher & Dienner
ATTORNEYS.

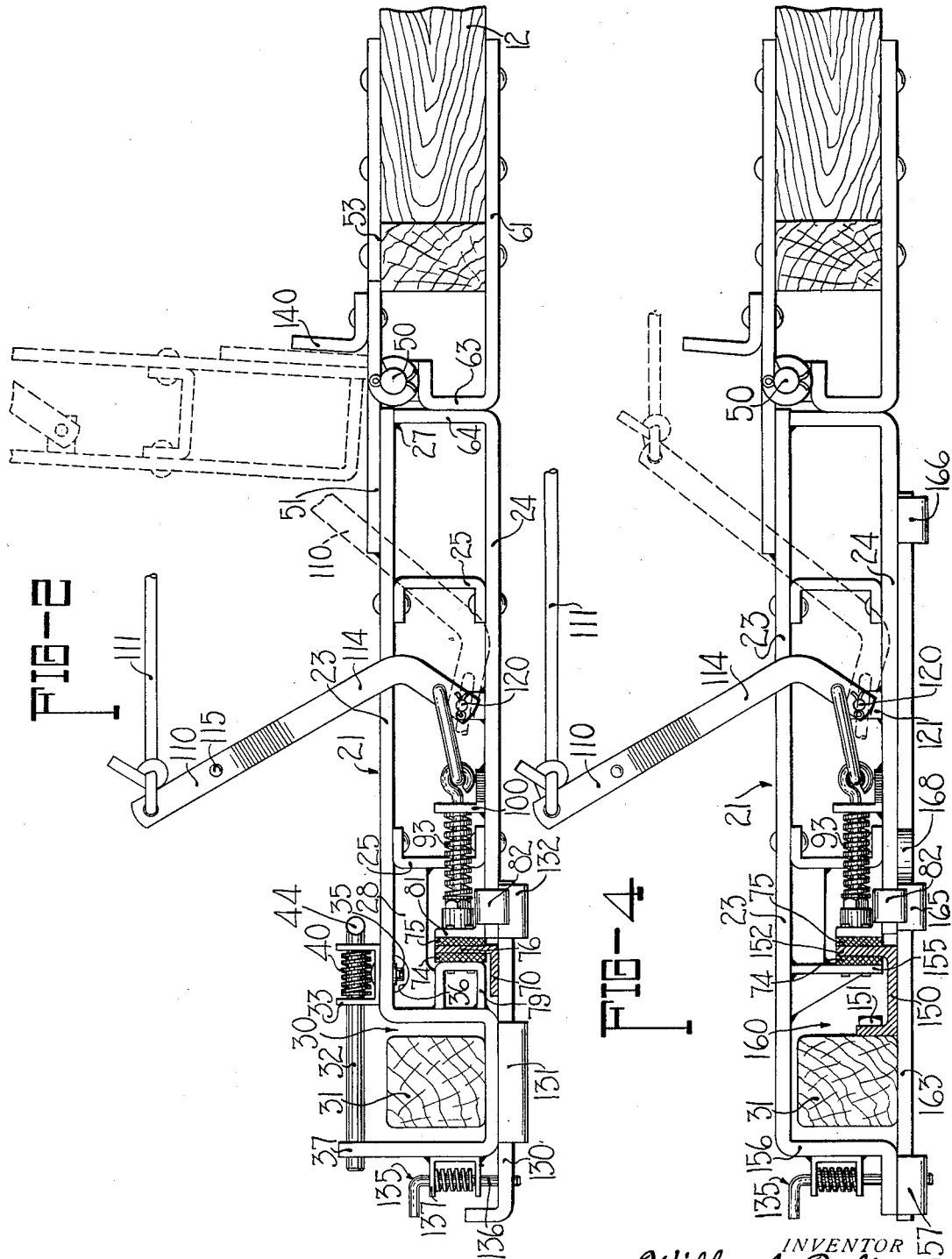

Feb. 6, 1934.    W. J. COULTAS    1,945,732
WAGON HITCH
Filed May 3, 1933    3 Sheets-Sheet 3
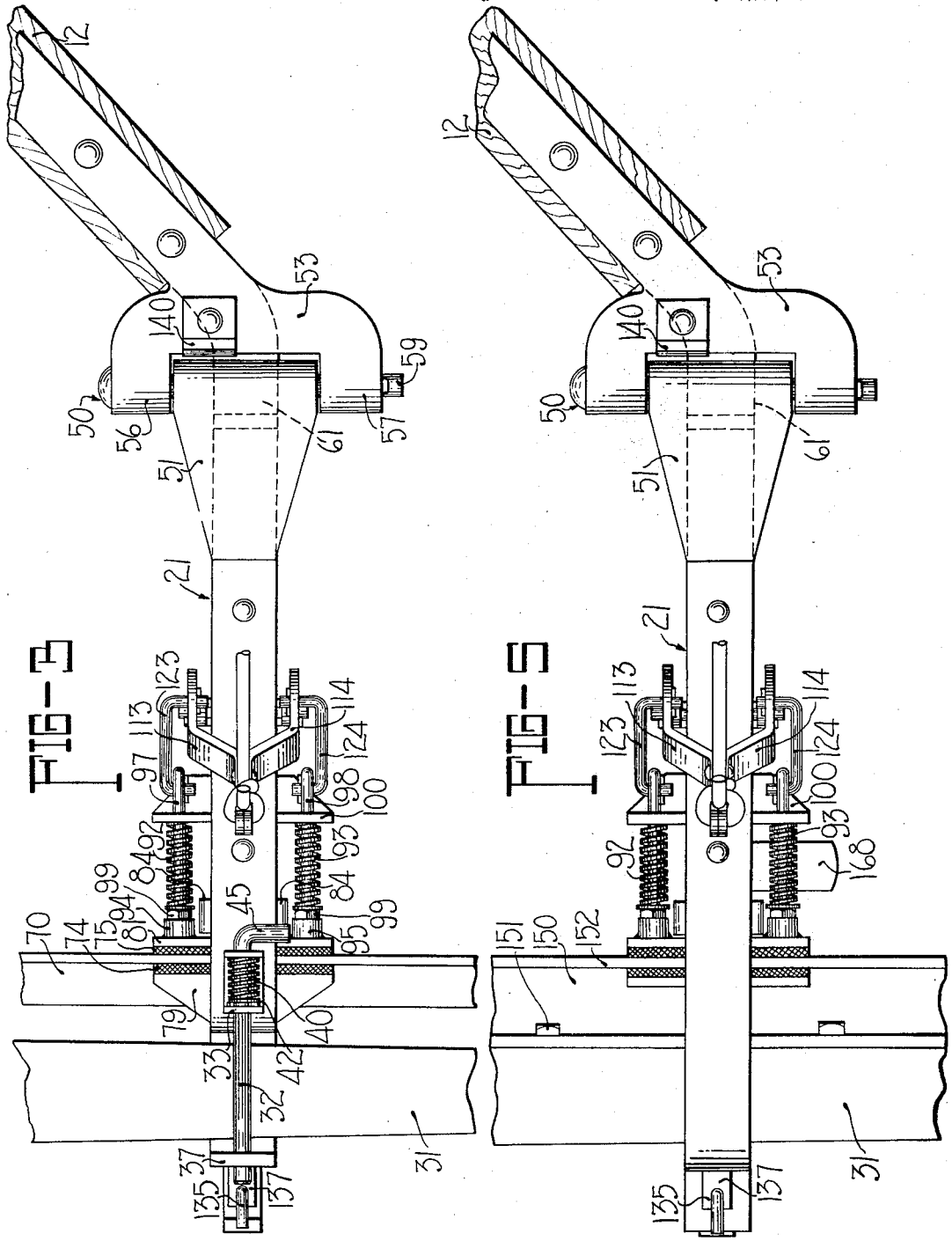

Patented Feb. 6, 1934

1,945,732

UNITED STATES PATENT OFFICE 1,945,732

WAGON HITCH

Wilbur J. Coultas, Moline, Ill., assignor to Deere & Company, Moline, Ill., a corporation of Illinois Application May 3, 1933. Serial No. 669,142

14 Claims. (Cl. 280—33.44)

The present invention relates to draft connections and the like, more particularly to connections embodying an adjustable wagon hitch for connecting an agricultural implement and wagon to a tractor or other pulling vehicle.

It is old to provide hitch means by which a tractor can be operated to pull a trailing machine, such as a corn picker and the like, and a wagon disposed alongside such machine to receive the discharge therefrom. It is also old in such hitch means to provide for adjusting the position of the wagon with respect to the machine or implement for the purpose of distributing the load directed into the wagon. It is with such connections as those last mentioned that the present invention is particularly concerned, and the principal object of the present invention is the provision of an adjustable wagon hitch of this type wherein not only is the adjustment of the wagon with respect to the implement or machine easily accomplished but, in addition, the present invention contemplates a wagon hitch wherein the detachment of a loaded wagon is easily accomplished. Likewise, the present invention also contemplates such construction that the attachment of an empty wagon to the hitch means is easily and conveniently accomplished. In this way, little, if any, maneuvering of the tractor and implement is necessary, and also little time is lost in disconnecting a loaded wagon and attaching an empty wagon in its place.

Another object of the present invention is the provision of means providing for the more or less automatic disposal of certain of the hitch connections in such a manner that the tractor and the implement need not be diverted from their normal course in approaching an empty wagon disposed in proper position alongside the normal course of travel of the tractor and implement to be connected therewith.

Another object of the present invention is the provision of improved means for releasably connecting the wagon with the hitch means, the releasable means being of somewhat simplified construction as compared with similar devices of the prior art.

These and other objects and advantages of the present invention will be apparent to those skilled in the art after a consideration of the following detailed description of actual constructions embodying the principles of the present invention, taken in conjunction with the accompanying drawings.

In the drawings:

Figure 1 is a top plan view of an agricultural machine embodying a tractor, an implement in the form of a corn picker connected therewith, and a wagon connected with the tractor and the implement and disposed alongside the latter, in connection with improved hitch means embodying the principles of the present invention;

Figure 2 is a fragmentary view taken on an enlarged scale substantially along the line 2—2 of Figure 1 and looking in the direction of the arrows;

Figure 3 is a top plan view of the construction shown in Figure 2; and

Figure 4 and 5 are views corresponding to Figures 2 and 3 and illustrating a slightly different form of construction.

Referring now to the drawings, particularly Figures 1, 2 and 3, the tractor is indicated by the reference numeral 1 and is shown as connected with an implement in the form of a corn picker 2 by means of a draft frame 3 forming a part of or connected with the corn picker 2. A wagon 5 is disposed alongside the corn picker 2 in order to receive the ears of corn directed thereto from the picker by the elevation means 6, the wagon being adapted to receive draft from the tractor 1 by improved connections in the form of a wagon hitch indicated in its entirety by the reference numeral 7.

Generally speaking, the wagon hitch 7 includes a diagonal beam 12 connected by pivot means 13 with the corn picker 2 or with the draft frame 3.

If desired, the intermediate portion of the diagonal beam 12 may be connected by a generally forwardly extending draft link 15 with either the tractor 1 or with some other part of the corn picker or the draft frame. A shoe 17 or the equivalent may be provided on the diagonal beam 12 for riding along the surface of the ground to support the beam 12 in proper position. Wagon hitches of this general type are illustrated in U. S. Patent No. 1,856,468, issued May 3, 1932, to myself and Carl J. Frederiksen, to which reference may be had for further details.

The end of the beam 12 opposite the pivot 13 is adapted to be releasably connected with the wagon 5 to transmit draft thereto by means now to be described and forming a major portion of the present invention.

Referring now more particularly to Figures 2 and 3, a laterally extending arm 21 is pivotally connected for vertical swinging movement about a substantially horizontal or longitudinally extending axis with respect to the laterally outer end of the diagonal beam 12. The arm 21 comprises an upper strap 23 and a lower strap 24 fixedly connected together in spaced relation by means of spacer members 25. Preferably, the straps are rigidly secured together not only by the spacers 25, but also by welding, as at 27, and by means of a connecting web 28, secured as by welding to certain of the spacers and either or both of the straps 23 and 24.

The outer end of the upper strap 23 is bent in U-shaped formation to provide a recess 30 for receiving the tongue 31 of the wagon 5. The recess 30 is normally bridged by a rod or plunger 32 which projects through perforations in a U-shaped bracket 33 pivotally supported on the upper strap by a pivot 35. The reinforcing web 28 is notched out, as as 36, to accommodate said construction. The outer end of the rod or plunger 32 also projects through perforations in the outer leg or termination 37 of the upper strap 23. The plunger 32 is normally held in this position by means of a spring 40 confined between the arms of the U-shaped bracket 33, one end of the spring 40 reacting against one of the arms while the other end of the spring is disposed against a stop washer 42 or the equivalent carried by the plunger rod 32. The inner end 44 of the plunger rod is bent at right angles, as indicated at 45 in Figure 3, to provide means for pulling the rod 32 inwardly of the arm 21 and out of the perforation in the leg 37 against the tension of the spring 40. After this has been done the plunger 32 and its supporting bracket 33 may be rotated about the axis of the pivot 35 to permit the removal of the tongue 31.

The rear end of the arm 21 is pivotally connected with the diagonal beam 12 by means of a horizontal hinge 50 which comprises a plate 51 fixed to the upper strap 23, as by welding or the like, and a plate 53 which is bolted to the top of the diagonal beam 12. The outer end of the plate 53 is U-shaped in formation and the ends of the arms 56 and 57 thereof, as well as the end of the plate 51, are bent to form sleeves for receiving a pivot bolt or hinge pin 59.

A lower plate 61 is fixed to the lower side of the diagonal beam 12, and the end 63 of the plate 61 is bent upwardly at right angles and forms an abutment for engaging the upwardly turned end 64 of the lower strap member 24. The engagement of these members holds the arm 21 in horizontal working position, as shown in full lines in Figure 2.

Draft is transmitted from the laterally outer end of the arm 21 to the wagon 5 through a friction brake construction or the equivalent adapted to be frictionally connected with the wagon 5. To this end, the wagon tongue 31 is provided with a rigid member in the form of an angle iron 70 which has a bent portion 71 at its rear end and suitably apertured to receive the king pin 72 by which draft is transmitted to the wagon tongue 31. Draft is transmitted to the angle member 70 through a friction brake comprising a pair of brake shoes 74 and 75 which are adapted to clamp the vertical flange 76 of the angle member 70 between them. The brake shoe 74 is supported by and fixed to a U-shaped bracket 79 welded or otherwise secured to one leg of the U-shaped end 37 of the upper strap member 23. Also, the bracket 79 is welded to the reinforcing web 28. The other brake shoe 75 is slidably supported on the lower strap by means of a slide member 81 having depending ears 82 which embrace the sides of the lower strap member 24.

Suitable biasing means in the form of springs 92 and 93 are provided for urging the brake shoe 75 toward the fixed brake shoe 74. For this purpose, the bracket 81 is provided with bosses 94 and 95, provided with suitable threaded apertures for adjustably receiving the threaded ends of eyebolts 97 and 98 upon which the springs 92 and 93 are mounted. Lock nuts are provided for retaining the bolts 97 and 98 in any given position of adjustment. The ends of the springs 92 and 93 opposite the bosses 94 and 95 bear against a bracket 100 suitably fixed as by welding or the like, to the lower strap member 24 and having apertures through which the eyebolts 97 and 98 are passed. In this manner the springs 92 and 93 react against the bracket 100 suitably fixed as by welding or the like, to the lower strap member 24 and having apertures through which the eyebolts 97 and 98 are passed. In this manner the springs 92 and 93 react against the bracket 100 to force the brake shoe 75 toward the fixed brake shoe 74, thereby clamping between them the vertical flange 76 of the draft bar 70. The slight movement of the draft bar accommodating the movement of the slidable brake shoe 75 is provided for by virtue of the pivotal connection between the rear end of the angle bar 70 and the tongue 31.

As will be clear from Figure 1, when the brake shoes 74 and 75 clamp the vertical flange of the angle bar 70 therebetween, draft from the diagonal beam 12 is transmitted to the wagon 5. Since the angle bar 70 is a substantially rigid member and is capable of taking both tensile and compression stresses, it will be apparent that draft may be transmitted to the wagon 5 either forwardly or rearwardly. For example, when the machine is moving forwardly, the wagon 5 is prevented from overrunning the machine because the frictional engagement between the brake shoes on the arm 21 and the bar 70 prevents the wagon from advancing with respect to the hitch connections. It is also to be observed that, by virtue of the frictional engagement between the brake shoes 74 and 75 and the rigid member 70, when the machine is first started there may occur a slight slippage between the brake shoes and the bar, thereby relieving the tractor of shocks and the like incident to starting the wagon 5 in motion. This is a particularly important feature, especially where the wagon is fully loaded or partially loaded. It will also be apparent that, where frictional members 74 and 75 or the equivalent are provided and draft is transmitted to the wagon by such frictional means, when the machine is in operation, if the frictional members are momentarily released, the wagon 5 will drop back with respect to the other parts of the machine. Therefore, in starting out across the field, if the wagon is disposed well forward with respect to the elevator 6 of the corn picker, the rear portion of the wagon bed will first become filled and then if the friction draft means are momentarily released the wagon will drop back slightly, thereby permitting the more forward portions of the wagon bed to become filled. In this way the wagon 5 may be loaded evenly from the rear end to the front end.

The brake means 74—75 may be released, according to the present invention, by means of a control mechanism comprising a lever 110 to which is connected a rope 111 leading to the operator's position on the tractor. The lever 110 comprises a pair of straps 113 and 114 fixed together by means of a rivet 115 and spaced apart at their lower ends so as to embrace the upper strap member 23. The lower ends of the straps 113 and 114 are pivotally connected by means of a pivot pin 120 to a bracket 121 which is welded or otherwise suitably secured to the lower strap member 24 of the arm 21. Suitable apertures are provided in the lower ends of the straps 113 and 114, spaced from the axis of the pivot pin 120, and in these apertures U-shaped links 123 and 124 are disposed, the forward ends of these links being pivotally connected with the eyes of the bolts 97 and 98. In this way, the lever 110 is operatively connected with the eyebolts 97 and 98 and is operative when swung to the position shown in dotted lines in Figure 2 to move the slidable brake shoe 75 against the tension of the springs 92 and 93 and out of clamping engagement with the draft bar 70. In this way the transmission of draft to the wagon 5 is interrupted.

In the form of the invention shown in Figure 2, the draft bar or angle arm 70 is held in position between the brake shoes 74 and 75 when the latter are released by a slide member 130 upon which the member 70 is adapted to rest and which is slidably disposed in pairs of lugs 131 and 132 carried by the base of the U-shaped end portion of the upper strap 23 and by the outermost end of the lower strap member 24. A spring latch 135 comprising a spring pressed plunger 136 is slidably carried by a bracket 137 fixed to the outer end of the upper strap member 23 and is adapted to engage in an aperture formed in the outer end of the supporting slide 130.

In operation, as mentioned above, the operator normally starts with the wagon 5 positioned so that the elevator 6 of the corn picker will deposit corn in the rear end of the wagon. As the wagon fills up the operator releases the brakes 74—75 occasionally to allow the wagon to fall back with respect to the implement 2. When the wagon has been completely filled, the operator pulls the lever 110 to the over-center locked position shown in dotted lines in Figure 2. From this figure it will be observed that the pivotal connections between the links 123 and 124 and the straps 113 and 114 are below the line joining the pivot pin 120 and the eyes of the bolts 97 and 98. This construction, actually, forms a toggle lock for holding the brakes 74 and 75 released. With the braking means thus locked in released position, continuing the forward advance of the tractor will move the implement 2 away from the wagon, the angle iron member 70 being free to pull out of the brake and the pole 31 being free to slide out of the recess 30 at the end of the arm 21.

When the wagon tongue or pole 31 and the draft bar 70 have been released from the arm 21, the operator, by further pulling on the rope 111 can swing the arm 21 upwardly about the hinge 50 into the position shown in dotted lines in Figure 2 and against a stop 140 carried by the plate 53.

By virtue of this construction it is possible for the operator to continue the forward advance along the rows being picked until he is opposite an empty wagon which has previously been positioned in the proper position relative to the rows, the hinge 50 being so positioned that the arm 21 will clear the wheels of the empty wagon. This makes it unnecessary for the operator to veer off his course in moving up to and opposite the empty wagon. When the operator reaches the proper position opposite the empty wagon, he stops the tractor and the tongue 31 of the empty wagon is placed in position in the recess 30, the plunger 44 being previously swung out of engagement with the end 37 to permit placing the tongue into the recess 30. After the tongue is in proper position, the latch or plunger 44 is reengaged, as shown in Figure 2. Next, the latch 135 is disengaged from the slide 130, and the latter is pulled outwardly sufficiently to permit the angle iron 70 to be inserted between the brake shoes 74 and 75, the latter being held in separated or released position by virtue of the toggle lock mentioned above. The toggle lock is then broken by swinging the lever 110 upwardly, thus permitting the springs 92 and 93 to move the brake elements 74 and 75 together to clamp the vertical leg 76 of the angle member 70 therebetween. Thereupon the operator is ready to advance.

It is important to note that in this construction it is not necessary for the operator to stop the forward travel of the machine to release a filled wagon. Also, by virtue of the disposition of the pivoted arm 21 and its hinge 50, it is not necessary to stop the machine or to change the course of travel thereof in approaching an empty wagon until the machine is alongside the empty wagon and in the proper position to engage the same.

In Figures 4 and 5, a modification of the structure described above is shown, many of the parts being identical or similar, as will be apparent, and such identical or similar parts have been indicated by the same reference numerals used above. In Figures 4 and 5 the tongue or pole 31 is provided with a rigid member 150 securely fixed thereto, as by bolts 151. This member 150 is of channel formation and has a vertical flange 152 corresponding to the flange 76 of the angle member 70 described above. The brake elements 74 and 75 and the lever 110 and springs 92 and 93 are of practically the same construction as shown in Figures 2 and 3 and described above. In Figures 4 and 5, however, the fixed friction brake element 74 is secured to a bracket 155 secured to the upper strap member 23, but the latter member is not provided with a U-shaped portion, as is the strap member shown in Figure 2, the laterally outer end of the strap member 23 being continued, and terminating in a downwardly directed portion 156 which carries the latch 135 and is provided with a pair of ears 157. Thus, the upper strap member 23 shown in Figures 4 and 5, in connection with the lower strap member 24 and the bracket 155, provides a U-shaped recess 160 similar to the recess 30 shown in Figure 2, but opening downwardly instead of upwardly.

For closing the recess 160 and holding the tongue 31 and rigid draft transmitting member 152 in position in the recess 160 and between the brakes 74 and 75, a slide 163 is provided which is similar in a number of respects with the slide 130 shown in Figure 2. The slide 163 is supported by the ears 157 at the outer end of the upper strap member 23 and by additional pairs of ears 165 and 166 secured to or carried by the lower strap member 24 of the arm 21. The slides 165 and 166 serve as stops, cooperating with a handle 168 for limiting the movement of the slide 163, as shown in Figure 5.

To connect up the wagon tongue 31 with the arm 21 shown in Figures 4 and 5, the slide 163 is moved inwardly until the handle 168 contacts with the ears 166, thereby opening up the recess 160 between the ears 157 and 165 so that the pole 31 and the rigid draft member 150 fixed thereto may be lifted up into position with the vertical flange 152 of the draft member 150 disposed between the brake shoes 74 and 75, which have previously been released as described above in connection with Figures 1, 2 and 3, whereupon the slide 163 may be replaced and the pole 31 rested upon it.

In operation in the field, the construction illustrated in Figures 4 and 5 is controlled in the same way as the construction shown in Figures 1, 2 and 3. It is to be noted, however, that in Figures 4 and 5 it is necessary that a channel member 150 be applied to the tongues of all of the wagons to be used in this connection, whereas, in Figure 1, the wagons 5 employed may be of standard construction and only one, or at least only a few, rigid draft bars 70 are necessary, since each is attached to its wagon by a single removable pin. If, in Figures 1, 2 and 3, each wagon 5 is not equipped with an angle bar 70, it will be necessary to take the angle bar 70 off the loaded wagon and connect it to the empty wagon when making the change.

While I have described above the construction in which the principles of the present invention are preferably embodied, it will be apparent to those skilled in the art that my invention is not to be limited to the specific details shown and described, but that, in fact, widely different means may be employed in the practice of the broader aspects of my invention.

What I claim, therefore, and desire to secure by Letters Patent, is:

1. The combination of a tractor, an implement, a wagon, a draft device connecting the implement with the tractor, a substantially rigid member connected with the wagon and means carried by the draft device and frictionally engageable with said rigid member to transmit draft to the wagon and to hold the same against advancing relative to the implement.

2. In combination, a tractor, an implement, a wagon, a draft device connecting the implement to the tractor, a rigid member connected with the wagon, means carried by the draft device and frictionally engaging said rigid member to transmit draft to the wagon and to hold the wagon against advancing relative to the implement, and means for releasing said frictionally engaging means at will to adjust the position of the wagon with respect to the implement.

3. In combination, a tractor, an implement, a wagon, a draft device connecting the implement with the tractor, a rigid member connected with the wagon, a laterally extending arm pivotally connected with said draft device for movement into and out of operative position with respect to said wagon, and means carried on said arm and frictionally engageable with said rigid member to transmit draft to the wagon and to hold it against advancing relative to the implement.

4. In combination, a tractor, an implement, a wagon, a draft device connecting the implement with the tractor, a substantially rigid member connected with the wagon, a laterally extending arm pivotally connected with said draft device to transmit draft therefrom to the wagon, means carried on said arm and frictionally engageable with said rigid member to transmit draft to the wagon and to hold it against advancing relative to the implement, and means for releasing said frictionally engaging means, said releasing means reacting against said arm to swing the same about its pivot.

5. In combination, a tractor, an implement, a wagon, a draft device connecting the implement to the tractor, a rigid member connected to the wagon, a laterally extending arm pivotally connected to said draft device on a longitudinally extending horizontal pivot, means carried on said arm and frictionally engaging said rigid member to transmit draft to the wagon and to hold it against advancing relative to the implement, said pivot being disposed outside of the outermost plane of the inside wheels of the wagon, and means for releasing said frictionally engaging means at will to fix the position of the wagon with respect to the implement, or to disconnect the wagon, and for swinging said arm upwardly about said pivot.

6. In combination, a tractor, an implement, a wagon having a tongue, a draft device connecting the implement to the tractor, a rigid member connected to said tongue and disposed in proximity thereto, an arm extending laterally from said draft device, means on said arm for supporting said tongue and said rigid member, and means on said arm for frictionally engaging said rigid member, said last means being optionally releasable to permit free movement of said arm relative to said tongue and rigid member.

7. A draft device for pulling a wagon having a rigid forwardly extending member connected thereto, said draft device comprising a frame for supporting said member, a pair of separable brake shoes on said frame for frictionally engaging said member, spring means for urging said brake shoes together, and means for moving said brake shoes apart to release said member.

8. A draft device for pulling a wagon having a rigid forwardly extending member connected thereto, said draft device comprising a frame, a pair of brake shoes for frictionally engaging said member, one of said shoes being fixed on said frame and the other being slidable thereon, spring means for urging said brake shoes together, means for moving said brake shoes apart to release said member, and a support on said frame movable into a position below said brake shoes to support said member when released and movable away from below said brake shoes to provide for the positioning of said member between said brake shoes.

9. In combination, a tractor, an implement, a wagon having a tongue, a draft device connecting the implement to the tractor, a rigid member disposed in proximity to said tongue and connected thereto solely at its rear end, an arm extending laterally from said draft device, means on said arm for supporting said tongue and said rigid member, and means on said arm for frictionally engaging said rigid member, said last means being optionally releasable to permit free movement of said arm relative to said tongue and said rigid member whereby the position of said wagon relative to the implement may be adjusted or the wagon may be disconnected by holding said frictionally engaging means released to permit the withdrawal of the free end of said member therefrom.

10. In combination, a tractor, an implement, a wagon, a draft device connecting the implement with the tractor, a laterally extending arm pivotally connected with said draft device for swinging movement about a substantially horizontal pivot, means carried by said arm and adapted to be operatively connected with said wagon to transmit draft thereto, and means also carried by said arm and operative to release said last named means and to swing said arm about its pivot into an inoperative position.

11. In combination, a tractor, an implement, a wagon, a draft device connecting the implement with the tractor, a laterally extending arm pivotally connected with said draft device for swinging movement about a substantially horizontal pivot, cooperating means carried by said wagon and said arm for releasably connecting the latter to transmit draft to the wagon, and means including a pivoted lever mounted on said arm and operative after releasing said cooperative means for swinging the arm about its pivot into an inoperative position with respect to said wagon.

12. In combination, a tractor, an implement, a wagon, a draft device connecting the implement with the tractor, a laterally extending arm pivotally connected with said draft device for swinging movement about a substantially horizontal pivot, releasable means for operatively connecting said arm with said wagon to transmit draft thereto, means including a swinging lever for releasing said last named means for interrupting the transmission of draft to said wagon, and a stop carried by said draft device for limiting the swinging movement of the arm.

13. In combination, a tractor, an implement connected with the tractor, a wagon having a rigid forwardly extending member connected thereto, a beam connected with the implement, and means carried by said beam frictionally engageable with said rigid member to transmit draft to the wagon and to hold the same against advancing relative to the implement.

14. In combination, a tractor, an implement, a wagon, a draft device connecting the implement to the tractor, a rigid member connected with the wagon, means disposed between the wagon and the implement and frictionally engaging said rigid member to transmit draft to the wagon and to hold the wagon against advancing relative to the implement, and means for releasing said frictionally engaging means at will to adjust the position of the wagon with respect to the implement.

WILBUR J. COULTAS.